(12) United States Patent
Iftime et al.

(10) Patent No.: US 10,173,907 B2
(45) Date of Patent: Jan. 8, 2019

(54) RECYCLABLE POROUS DESALINATION MATERIAL

(71) Applicant: Palo Alto Research Center Incorporated, Palo Alto, CA (US)

(72) Inventors: Gabriel Iftime, Dublin, CA (US); Jessica Louis Baker Rivest, Palo Alto, CA (US); Armin R. Volkel, Mountain View, CA (US); Divyaraj Desai, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 81 days.

(21) Appl. No.: 15/356,340

(22) Filed: Nov. 18, 2016

(65) Prior Publication Data

US 2018/0141828 A1    May 24, 2018

(51) Int. Cl.
  *C02F 1/28* (2006.01)
  *B01J 20/26* (2006.01)
  *B01J 20/28* (2006.01)
  *C02F 101/12* (2006.01)
  *C02F 103/08* (2006.01)

(52) U.S. Cl.
  CPC ............. *C02F 1/285* (2013.01); *B01J 20/264* (2013.01); *B01J 20/28004* (2013.01); *B01J 20/28007* (2013.01); *B01J 20/2808* (2013.01); *B01J 20/28016* (2013.01); *B01J 20/28045* (2013.01); *B01J 20/28083* (2013.01); *B01J 20/28085* (2013.01); *C02F 2101/12* (2013.01); *C02F 2103/08* (2013.01); *C02F 2303/16* (2013.01)

(58) Field of Classification Search
  CPC ............... B01J 20/264; B01J 20/28004; B01J 20/28007; B01J 20/28016; B01J 20/28045; B01J 20/2808; B01J 20/28083; B01J 20/28085; C02F 1/285; C02F 2101/12; C02F 2103/08; C02F 2303/16
  See application file for complete search history.

*Primary Examiner* — Dirk R Bass
(74) *Attorney, Agent, or Firm* — The Marbury Law Group, PLLC

(57) ABSTRACT

A porous material including polymerized units containing pores is provided, which can be employed for desalination applications. Each of the units includes at least one aromatic amino group and at least one hydroxyl group. The aromatic amino groups and the hydroxyl groups are arranged on surfaces of the pores in geometries configured to capture sodium chloride from an aqueous environment. The porous material can be provided as particles or a sponge. The porous material can be manufactured from a solution including monomers, a porogen, and an initiator by a polymerization process. The porous material can be reused after a desalination process by treatment with deionized water. A steam generation apparatus can be employed to facilitate removal of sodium chloride from the porous material in which sodium chloride is captured.

10 Claims, 6 Drawing Sheets

RECYCLABLE POROUS DESALINATION MATERIAL

TECHNICAL FIELD

The present disclosure relates generally to the field of desalination process, and specifically to a porous compound for absorbing sodium chloride from a saline solution, a method of manufacturing the porous compound, a method of using the compound, and a system for recycling the compound after absorption of sodium chloride.

BACKGROUND

97% of the water on earth is in the oceans. Less than one percent of water on the earth's surface is suitable and readily available for direct consumption by human population and industries. Most of the surface fresh water is provided by rivers and lakes. Many places that do not have the geographic benefit of being close to such rivers and lakes suffer from a scarcity of fresh water. While transportation of fresh water from lakes and rivers through long pipelines and drawing underground fresh water have been popular solutions, such resources are becoming scarcer.

The leading technology for seawater desalination is reverse osmosis (RO), which can be effective in producing drinking water from ocean or brackish waters, but has several drawbacks in terms of environmental impact and energy consumption. Specifically, the reverse osmosis process releases large amounts of high salt concentration rejected water back into the ocean. Typically, for each gallon of water, 1-4 gallons of highly salted water is rejected. The impact on the environment is a significant concern with RO technology. Further, the reverse osmosis process is energy-intensive. Energy consumption in a reverse osmosis process ranges from 2.5 kWh/m$^3$ in large size modern state-of-the-art RO plants to over 5.5 kWh/m$^3$ in smaller size RO systems. Thus, there is a need for an environmentally friendly and low-energy desalination technology.

SUMMARY

According to an aspect of the present disclosure, a porous material is provided, which comprises pores that contain polymerized units therein. Each of the polymerized units comprises at least one aromatic amino group and at least one hydroxyl group. Instances of the aromatic amino groups and the hydroxyl groups are arranged within walls of each pore in geometries configured to capture sodium chloride from an aqueous environment.

According to another aspect of the present disclosure, a method forming a porous material is provided, which includes the steps of: providing a homogeneous mixture of monomers, an element selected from a catalyst and a polymerization initiator, and porogens in a solvent, wherein the monomers comprise at least one aromatic amino group and at least one hydroxyl group; inducing phase separation of the solvent and polymerization of the monomers, wherein a polymer network of units derived from the monomers is formed; and removing the solvent from the polymer network, wherein a porous material comprising pores that contain polymerized units therein is formed, wherein each of the polymerized units comprises at least one aromatic amino group and at least one hydroxyl group, and instances of the aromatic amino groups and the hydroxyl groups are arranged within walls of each pore in geometries configured to capture sodium chloride from an aqueous environment.

According to yet another aspect of the present disclosure, a method of using a porous material is provided, which includes the steps of: inducing contact between a porous material comprising pores that contain polymerized units therein and salt water including sodium chloride therein, wherein each of the polymerized units comprises at least one aromatic amino group and at least one hydroxyl group, wherein instances of the aromatic amino groups and the hydroxyl groups are arranged within walls of each pore and capture sodium chloride from the salt water; and separating the porous material after sodium chloride is captured by the porous material from a remaining material of the salt water by flowing water at a lesser salt concentration to flow through the porous material, the remaining material having a lesser concentration of sodium chloride than the salt water provided prior to contacting the porous material.

According to still another aspect of the present disclosure, a system for recycling a porous desalination material for reuse is provided. The system comprises an apparatus that includes: a water reservoir provided with a heater and a steam collection manifold configured to guide steam generated from liquid phase water in the water reservoir; a steam conduit configured to receive steam from the steam collection manifold and to direct the steam through a path extending through the liquid phase water and configured to add condensated steam to the liquid phase water; and at least one chamber located between sections of the steam conduit and configured to hold a material therein and to allow passage of steam therethrough.

DETAILED DESCRIPTION

Figure 1A:
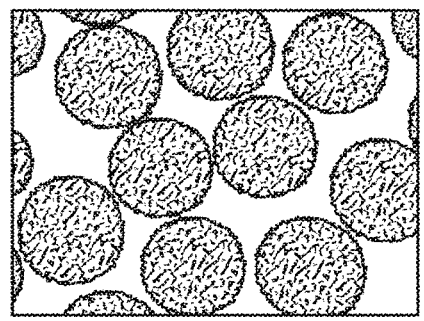
FIG. 1A illustrates particles embodying a porous material according to an embodiment of the present disclosure.

As used herein, "desalination" and variations thereof means the removal of individual ions, such as Na$^+$ and Cl$^-$ from an initial water source such that the salinity of desalinated water is less than the salinity of the initial water source.

As used herein, "salination," "resalination," and variations thereof means the addition of individual ions, such as Na$^+$ and Cl$^-$ to an initial water source such that the salinity of resalinated water is greater than the salinity of the initial water source.

Generally speaking, a major problem with extraction of salt from seawater is that water is the best solvent for NaCl.

All prior attempts to precipitate sodium chloride form seawater (which contains about 3.5% of NaCl in weight percentage) by addition of alcohols (methanol or ethanol) failed no matter how much alcohol was added. Therefore, sodium chloride extraction from water with alcohols alone seems impossible at low NaCl concentration such as seawater. Even if such a method worked, this approach would have major disadvantages: cost of the alcohols and of their removal from purified water.

T. C. Shields, Direct removal of sodium chloride from water by reaction with pp'-methylenedianiline, Chem. Commun. (London) 1968, 832, showed that a highly concentrated solution (12.5%) of NaCl in water can form a coordination compound with 4,4'-methylenedianiline from a solution in methanol. In this mixture of solvents, the coordination complex precipitates out of the solution. Despite the novelty of the process, this process has no industrial applicability because: (1) the high concentration salt (i.e., 12.5% in weight percentage) employed in the test was higher than sea water concentration by at least a factor of 3, (2) the NaCl capture process requires significant heating (i.e., up to 50 degrees Celsius.), (3) the process employs liquids such as methanol which must be removed entirely before potable water can be obtained (and thus, would add significant volumes and separation costs as well as water contamination concerns), and (4) there is no recycling process, which is a key requirement for industrial use.

According to an aspect of the present disclosure, a novel desalination method is provided, which employs a desalinating porous material to capture salt from seawater. Afterwards, the porous material can be recycled to be used again to desalinate new seawater. The present disclosure provides a design for monomers to be employed to form a porous polymerized desalinating material, particle morphology, and a recycling process.

The present disclosure provides a process which can be applied industrially and does not use organic solvents. The process of the present disclosure employs a porous solid material. The porous solid material contains coordinating amino groups and hydroxyl groups, which can reversibly coordinate with NaCl. The process of the present disclosure employs controlled shifting of the equilibrium in the reaction between the NaCl and the solid state coordinating particles either for adsorption or release of the captured NaCl from water solution.

The porous desalinating material can be employed to capture sodium chloride from salt water under ambient temperature. The salt-saturated desalinating material can be recycled employing an extraction process, which uses a small amount of hot water to produce a clean desalinating material. The recycled desalinating material can be used again to extract salt from new seawater in the next desalination process. The combination of the desalination process and the material recycling process can be repeated many times. The recycling process can provide extracted salt as solid which is not returned to the ocean.

Careful particle design should be employed to provide the function of NaCl adsorption employing a solid material only (i.e., without employing a fluid that needs to be subsequently separated from desalinated water). In one embodiment, the porous material of the present disclosure includes pores that contain polymerized units therein. Each of the units includes at least one aromatic amino group and at least one hydroxyl group. Instances of the aromatic amino groups and the hydroxyl groups can be arranged on surfaces of the pores in geometries configured to capture sodium chloride from an aqueous environment.

The porous material of the present disclosure can comprise a crosslinked co-polymer structure incorporating two types of functional groups: hydroxyl groups and aromatic amino groups. The hydroxyl groups and the aromatic amino groups are chemically bonded to an insoluble polymer backbone network.

The porous material of the present disclosure can have a highly porous structure, e.g., an aerogel-like structure. Further, the porous material of the present disclosure enables controlled reversible salt (NaCl) capture and release. The controlled reversible salt capture and release can be achieved by shifting the equilibrium of the NaCl or adsorbing particles in the desired direction. NaCl is captured (i.e., adsorbed) by coordination to the amino groups present in the porous material. The porous material of the present disclosure can be embodied in various forms such as porous particles, sponges, and the like.

In one embodiment, the porous material of the present disclosure can have a highly porous structure, similar to aerogels. High porosity and very large number of nanometer size pores within the structure can ensure high sea water penetration into the porous material, and can maximize the extraction efficiency. The general structure of the porous material is shown in FIGS. 1A-1E. In the porous material of FIGS. 1A-1E, the pores are arranged in a geometry that reproduces the environment encountered by NaCl in solutions containing water and compounds including amino groups in alcohol.

Figure 1B:
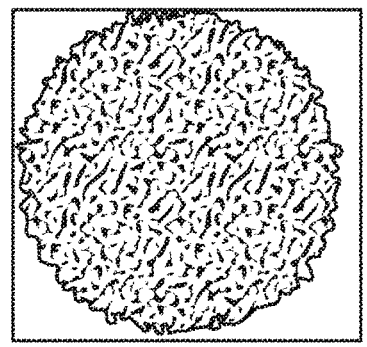
FIG. 1B is a magnified view of a particle in FIG. 1A.

Referring to FIGS. 1A and 1B, the porous material of an embodiment of the present disclosure can be embodied in the form of particles. In one embodiment, the porous particles can have a respective maximum dimension in a range from 10 nm to 10 mm, such as from 30 nm to 0.50 mm.

Figure 1C:
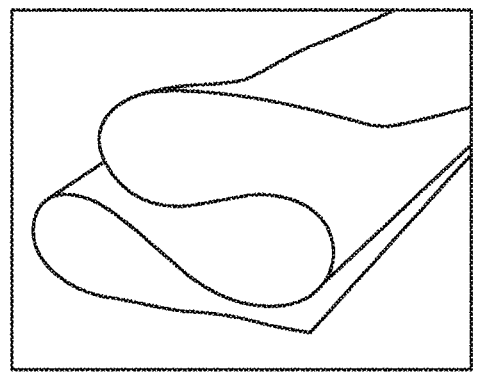
FIG. 1C illustrates a sponge including a porous material according to an embodiment of the present disclosure.
Figure 1D:
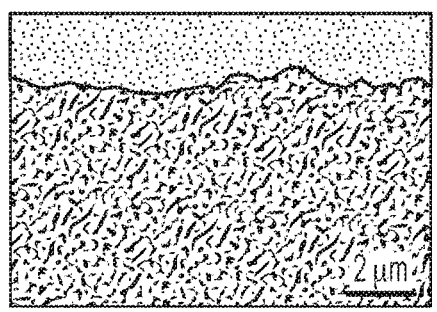
FIG. 1D illustrates a magnified view of a region of the porous material particles in FIG. 1B, which can be a region of the sponge of FIG. 1C.

Referring to FIGS. 1C and 1D, the porous material of another embodiment of the present disclosure can be embodied in the form of a sponge. In one embodiment, the sponge can have a macroscopic dimension. For example, the sponge can extend at least 1 mm (such as at least 1 cm) along at least one direction.

Figure 1E:
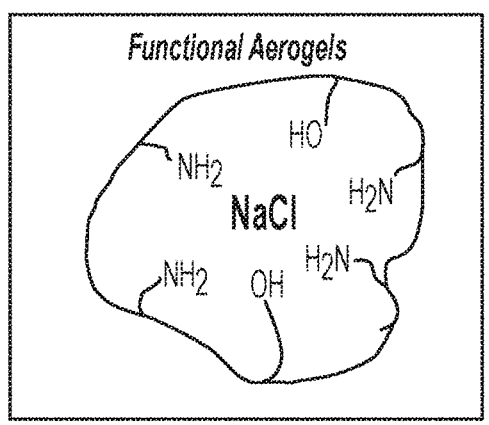
FIG. 1E is a schematic diagram illustrating an exemplary geometry in which amino groups and hydroxyl groups are arranged in a pore of the materials of FIGS. 1B and 1D.

Referring to FIG. 1E, the structure of the porous material of the present disclosure, whether embodied as porous particles or as a porous sponge, can incorporate aromatic amino groups and hydroxyl groups. The aromatic amino groups and the hydroxyl groups can be arranged on surfaces of the pores in geometries configured to capture sodium chloride from an aqueous environment. In one embodiment, the volume percentage of the pores with respect to the total volume of the porous material (as measured by a volume enclosed by a continuous macroscopic surface encapsulating the porous material and smooth at a scale of the maximum dimensions of the pores) can be in a range from 50% to 95%, such as from 65% to 90%. In one embodiment, the pores have respective maximum dimensions in a range from 0.5 nm to 10 microns, such as from 1 nm to 1 micron.

Referring to the fabrication process of the NaCl capturing material illustrated in FIG. 1F, this is synthesized by polymerization of monomers containing polymerizing groups and active functional groups for NaCl capture: aromatic amino groups and hydroxyl (alcohol) groups connected together by molecular linkers, to produce a polymer structure incorporating both types of "active" groups.

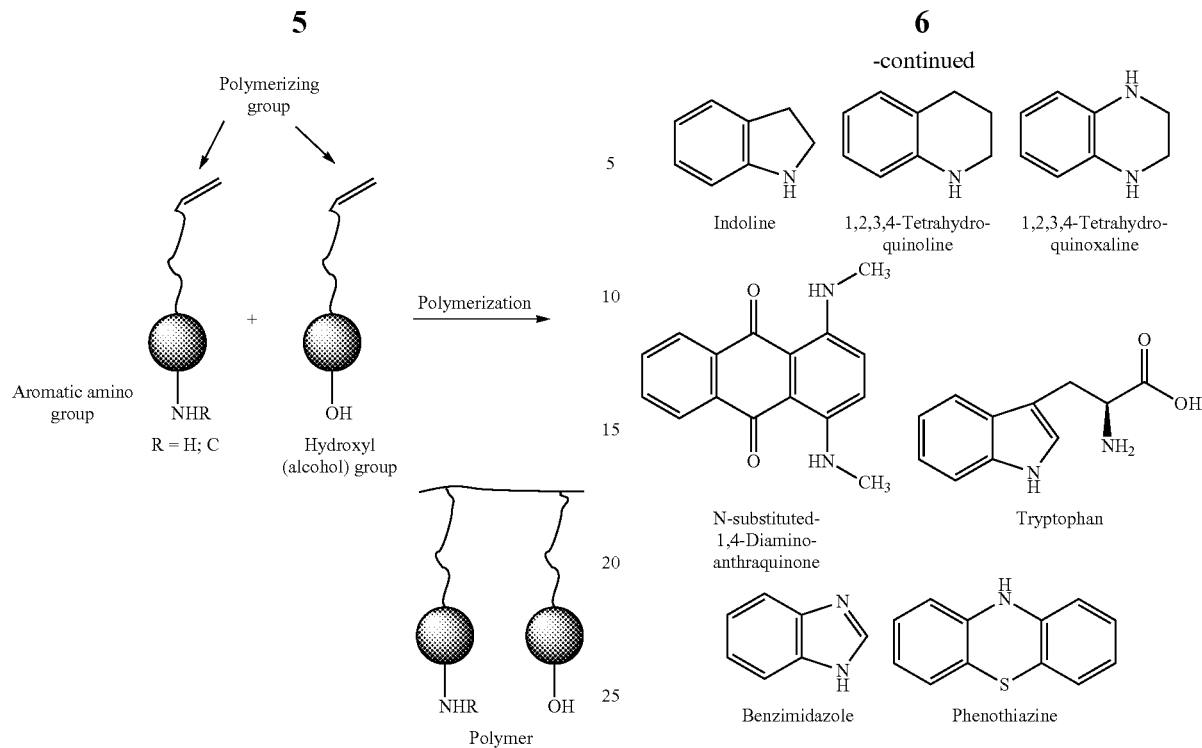

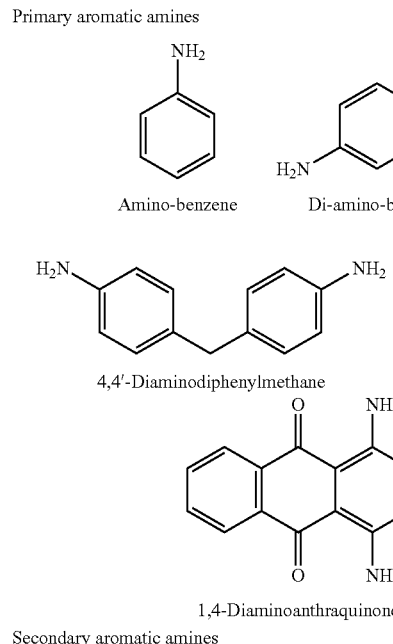

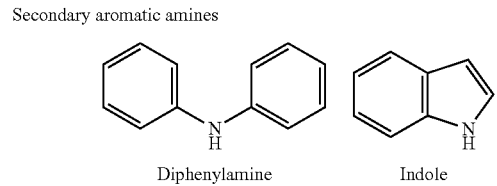

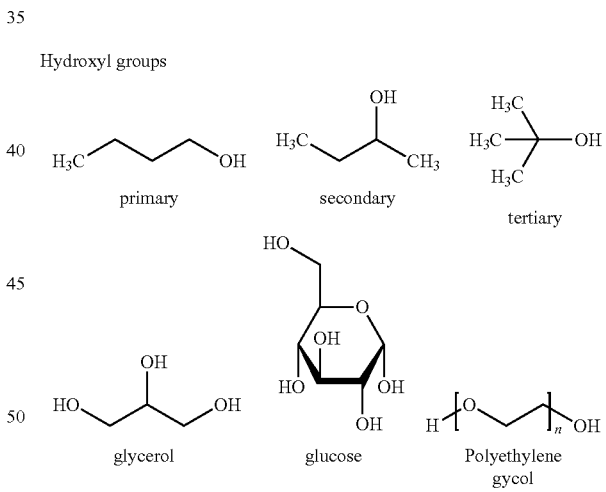

In one embodiment, the at least one aromatic amino group in the porous material of the present disclosure can be selected from a group of substituted primary aromatic amines and secondary aromatic amines. Non-limiting examples of specific types of amino groups are listed below.

The hydroxyl groups are selected from a group of primary, secondary and tertiary alcohols. They can contain one or more hydroxyl groups. Suitable examples include substituted methanol groups, ethanol group, glycol, polyethylene glycols, lactose, glucose, glycerol and the same. Non-limiting examples of the hydroxyl groups are listed below.

The "active" groups present in the monomers are linked to the polymerizing groups by molecular connectors. It is then understood that the functional amino and hydroxyl groups are substitutes such as to have means to be chemically liked to the polymerizing group. They can be substituted in any available position on their chemical structure.

The polymerizing groups are selected from a group of acrylate, methacrylate and vinyl group.

Figure 2:
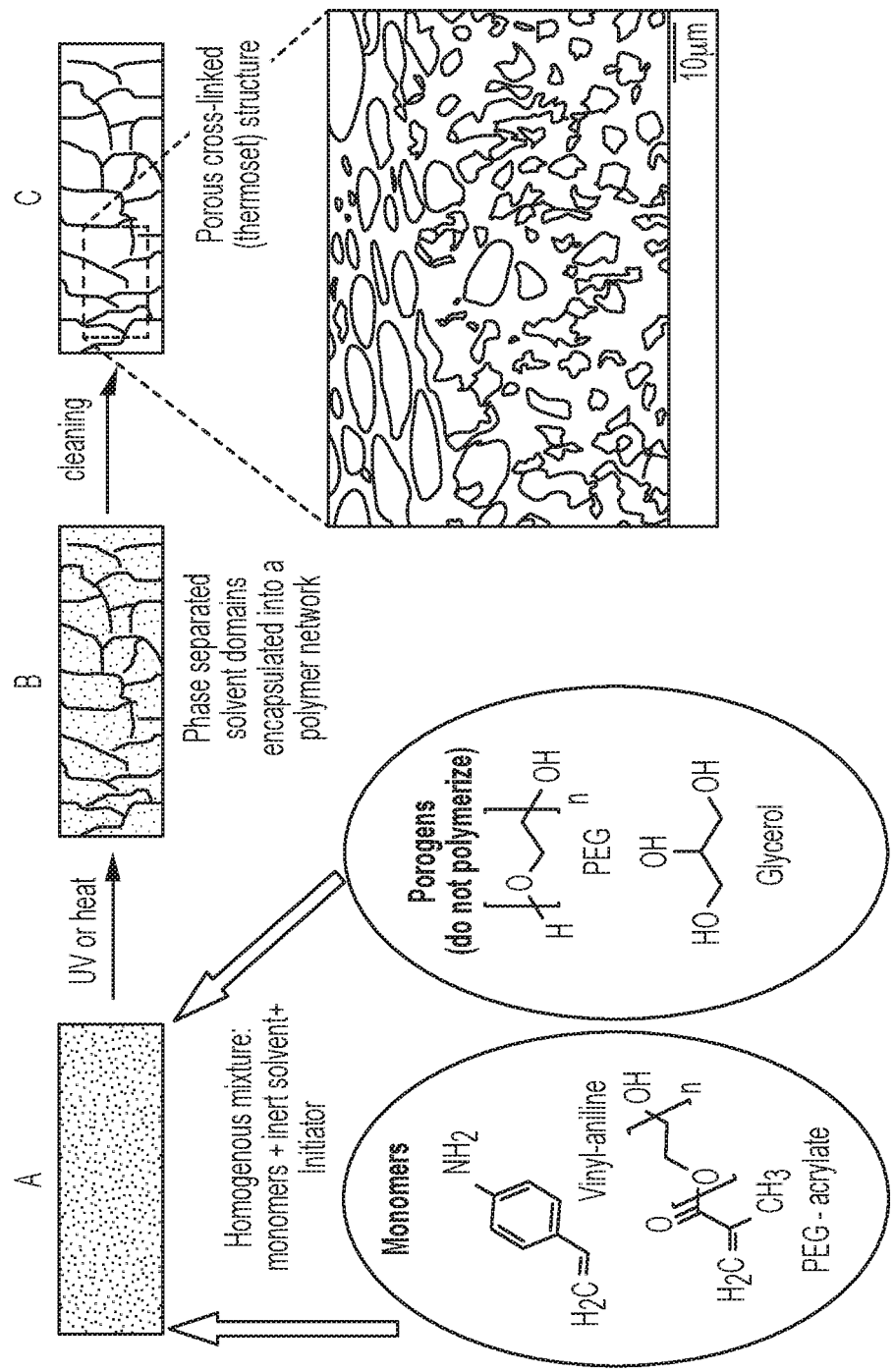
FIG. 2 illustrates a process for making the porous material according to an embodiment of the present disclosure.

As mentioned, the reactive monomers used to produce the polymer contain the "active groups" illustrated above and they are chemically bonded to the polymerizing groups. FIG. 2 illustrates how the selection of the amino and hydroxyl group works together with the selection of the polymerizing groups and the chemical linker to provide the reacting monomers actually used to produce the NaCl capturing polymers. The aromatic amino group is amino-benzene that is connected with the polymerizing group, vinyl bond, to provide the reacting amino containing monomer vinyl aniline. The hydroxyl group (polyethylene glycol) is chemically bonded to the acrylate group, i.e. polymerizing group to form polyethylene glycol acrylate monomer.

Aromatic amino monomers

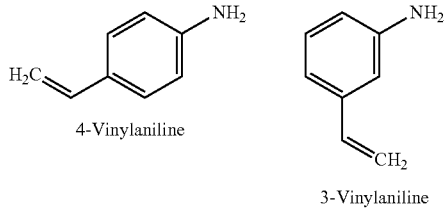

4-Vinylaniline

3-Vinylaniline

Hydroxyl monomers

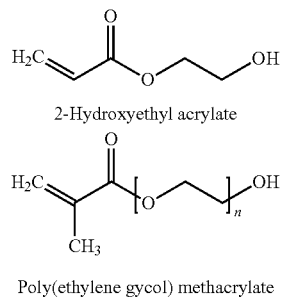

2-Hydroxyethyl acrylate

Poly(ethylene gycol) methacrylate

In one embodiment, the porous material can have a property of capturing an amount of sodium chloride that is at least 3% of a total weight of the porous material upon immersion in salt water including a sufficient quantity of NaCl. For example, the porous material can have a property of capturing an amount of sodium chloride that is at least 3% of a total weight of the porous material upon immersion in salt water weighing more than the porous material and including sodium chloride at a concentration of in a range from 0.1% to 10% in weight. In one embodiment, the porous material releases sodium chloride bonded with the aromatic amino groups and the hydroxyl groups upon exposure to deionized water. In one embodiment, capture of sodium chloride by the porous material is effected by coordination to the aromatic amino groups.

FIG. 2 illustrates a fabrication process that can be employed to form the highly porous material of the present disclosure. Generation of pores can be effected employing known methods for aerogel generation. For example, at stage A, a mixture of functional monomers and a compatible non-polymerizable liquid (solvent) is employed. A homogeneous mixture of monomers and porogens in a solvent is provided. The monomers comprise at least one aromatic amino group and at least one hydroxyl group. In one embodiment, first monomers including at least one aromatic amino group and second monomers including at least one hydroxyl group can be employed to form a polymerized structure including copolymer units. The homogeneous mixture can further comprise an initiator for initiating a polymerization reaction of the monomers.

At stage B, phase separation of the solvent and polymerization of the monomers is induced. A polymer network of units derived from the monomers is formed. The units may be copolymer units. Each copolymer unit can include at least one aromatic amino group and at least one hydroxyl group. Polymerization of the monomers can produce a crosslinked structure incorporating droplets of the additive solvent. The polymerization reaction can be induced by application of ultraviolet radiation or heat depending of the radical initiator used in the polymerization process.

At stage C, the solvent is removed to produce the polymer network, which can be a highly nanoporous structure. Aromatic amino groups and hydroxyl groups are arranged on surfaces of the porous material in geometries configured to capture sodium chloride from an aqueous environment.

The polymerized structure is configured to adsorb sodium chloride upon application of salt water thereupon. The geometries of the aromatic amino groups and the hydroxyl groups on the porous surfaces of the polymerized structure enable absorption of sodium chloride. The environment provided by the geometries of the aromatic amino groups and the hydroxyl groups and experienced by the $Na^+$ and $Cl^-$ ions in water is substantially the same as the environment provided by amino compounds dissolved in methanol. An example of monomers meeting the identified design criteria includes vinyl-aniline and units of PEG-acrylate. In this case, the polymerized structure includes units of vinyl-aniline and units of PEG-acrylate. The fabrication process can be performed with a different set of monomers for customized manufacturing applications. In one embodiment, capture of sodium chloride by the porous material is effected by coordination to the aromatic amino groups. In one embodiment, the porous material releases sodium chloride bonded with the aromatic amino groups and the hydroxyl groups upon exposure to deionized water.

Figure 3:
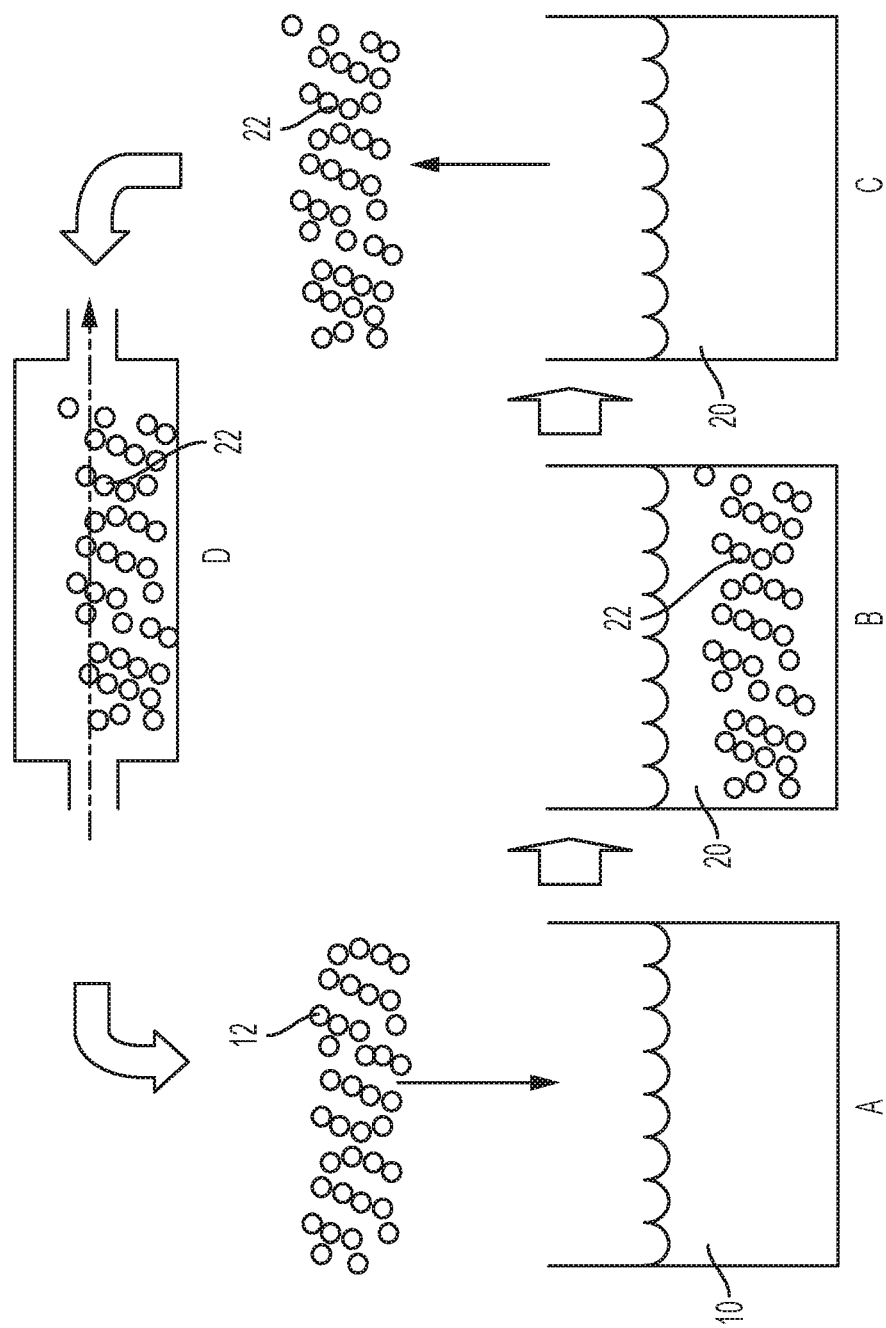
FIG. 3 is a schematic diagram illustrating various stages of use of a porous material of the present disclosure according to an embodiment of the present disclosure.

Referring to FIG. 3, a method of using the porous material 12 is illustrated. At stage A, contact is induced between the porous material 12 of the present disclosure and salt water 10 (such as seawater) including sodium chloride therein. The porous material 12 includes polymerized units containing pores therein. Each of the units comprises at least one aromatic amino group and at least one hydroxyl group. The porous material 12 can be in the form of particles, pellets, powder, sponge, or any other form that enables contact with salt water 12.

In one embodiment, the porous material 12 can be in a form of particles or beads having a respective maximum dimension in a range from 50 nm to 10 mm, and contact between the porous material 12 and the salt water 10 is induced by inserting the particles into an enclosure (such as a water tank) containing the salt water 10. In another embodiment, the porous material 12 can be in a form of a sponge that continuously extend at least 5 mm along one direction, and contact between the porous material 12 and the salt water 10 can be induced by absorption of the salt water 12 by the sponge.

At step B, the aromatic amino groups and the hydroxyl groups on surfaces of the pores of the porous material 12 capture sodium chloride from the salt water 10, thereby converting the salt water 10 into desalinated water 20. The porous material 12 becomes sodium-chloride-containing porous material 22. Thus, there is a net transfer of NaCl from the salt water 10 into the porous material 12, through which the salt water 10 becomes the desalinated water 20 and the porous material 12 (initially without sodium chloride therein) becomes the sodium-chloride-containing porous material 22. The porous material extracts NaCl from the salt water by forming a complex with the amino functionalized component present in the polymer structure. The capture of sodium chloride by the porous material 12 can be effected by coordination to the aromatic amino groups. In one embodiment, the porous material 12 captures an amount of sodium chloride that is at least 3% (such as at least 10% or at least 20% or at least 40%) of a total weight of the porous material upon immersion in the salt water 10.

The water transport trough materials including porous materials is generally diffusion controlled, which may be slow, particularly when the pore size is small. In order to saturate and therefore maximize the amount of extracted NaCl, multiple amounts of salted water need to flow through the pores of the NaCl capturing materials, i.e., including intake of salted water and release of clean water from the pores. In a preferred embodiment, the process in FIG. 3 includes means to accelerate the intake of new salted water into salt capturing material and the release of the clean desalinated water from the porous particles. This is particularly advantageous for desalinating water that has lower concentrations of salt when compared with sea water such as brackish water. Maximized removal of salt from lower concentration salted water is achieved by multiple salted water intake/clean water release by the salt capturing material. One simple approach to enable maximizing the amount of captured NaCl is to apply cycles of press/release of the particles or the sponge. After initial admission of the initial amount of salted water, the NaCl is captured onto the pores of the material. Pressing the wet particles or the wet sponge releases clean water. When in presence of the new amounts of salted water, the particles absorb new amounts of NaCl and then, on pressing release new amounts of clean desalinated water. The process may be repeated multiple times until the material absorbs the maximum amount of salt enabled by its NaCl absorbing amino-functional groups.

At step C, the sodium-chloride-containing porous material 22, i.e., the porous material 12 after sodium chloride is captured by the porous material 12, is separated from a remaining material of the salt water 10, which is the desalinated water 20. The sodium-chloride-containing porous material 22 may be scooped out from a tank, or may be squeezed to extract the desalinated water 20 if embodied as a sponge. The desalinated water 20 has a lesser concentration of sodium chloride than the salt water 10 originally provided to the porous material 12. In one embodiment, the sodium concentration in the desalinated water 20 can be in a range from 100 p.p.m. to 1%, depending on the amount of the porous material 12 employed and the surface geometry of the aromatic amino groups and the hydroxyl groups on the surfaces of the pores.

The desalinated water 20 can be consumed directly, or may be purified further as needed. Large amounts of salt can be removed by this process. Depending on the particles chemistry and salt concentration, the remaining amount of NaCl in the desalinated water 20 may be still above the level acceptable for human consumption. In this case, an additional reverse osmosis (RO) purification can be performed. An additional reverse osmosis (or other brackish water desalination methods) is also useful in removing salt types that are not removed by the current process, like large anions (carbonate, sulfate, phosphate, etc.). Because the salt concentration is reduced significantly during step B, the amount of additional energy required to further purify this water by RO is very small.

Referring to step D, release of captured sodium chloride from the sodium-chloride-containing porous material 22 (i.e., the porous material 12 after the porous material captures sodium chloride from the salt water 10) can be achieved by providing deionized water to the sodium-chloride-containing porous material 22 (which is a combination of the porous material and the captured sodium chloride). In one embodiment, the sodium-chloride-containing porous material 22 can be recycled by heating with a small amount of water (such as 10% of the amount of collected purified water). The recycling process is enabled by shifting the equilibrium of the reaction in favor of dissociation of NaCl from the porous material (i.e. amino groups). The released free NaCl can then be removed from the system. This can be achieved by recirculating the extracting water. The extracting water can be deionized as provided to the sodium-chloride-containing porous material 22. The extracting water includes sodium chloride during removal from the treated sodium-chloride-containing porous material 22.

Figure 4:
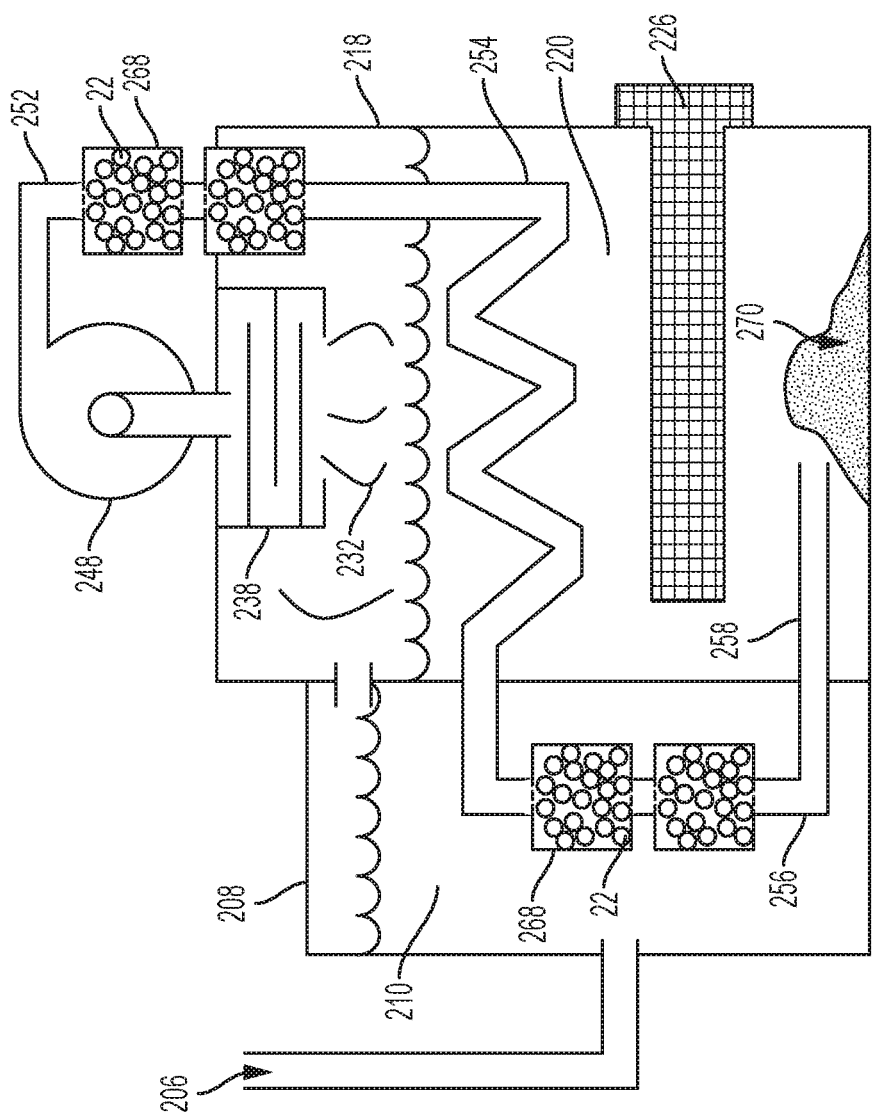
FIG. 4 is a schematic diagram illustrating a recycling process in which sodium chloride is removed from the porous material of the present disclosure according to an embodiment of the present disclosure.

In one embodiment, release of captured sodium chloride from the sodium chloride-containing porous material 22 can be performed by employing a system formed by modification of a vapor compression distiller by incorporating NaCl dissociation chambers 268 as illustrated in FIG. 4. The system includes a porous material reclaim apparatus and the sodium-chloride-containing porous material 22 loaded into NaCl dissociation chambers 268 provided in the apparatus.

The apparatus includes a water reservoir 218 provided with a heater 226 and a steam collection manifold 238 configured to guide steam generated from liquid phase water 220 in the water reservoir 218. The water reservoir 218 can be provided as a fluid-tight enclosure. A water supply chamber 208 can be provided, which is filled with supply water 210 and configured to provide additional water to the liquid phase water 220 in the water reservoir 218. The additional water compensates for collateral loss of water trapped inside the porous material 12 which may occur when the porous material 12 (from which sodium chloride has been removed through the NaCl extraction process) is removed from the apparatus. A water supply inlet 206 may be provided on the water supply chamber 208 to provide additional water. The opening between the water reservoir 218 and the water supply chamber 208 may be a valved opening, which may be opened to refill the liquid phase water 220 and closes once the refill is complete.

The apparatus includes a steam conduit (252, 254, 256, 258) configured to receive steam 232 from the steam collection manifold 238 and to direct the steam 232 through a path extending through the liquid phase water 220. The steam conduit (252, 254, 256, 258) is configured to add condensated steam to the liquid phase water 220, e.g., as the condensated steam exits the steam conduit (252, 254, 256, 258) and is added to the liquid phase water 220. The system can include a compressor 248 configured to impel the steam 232 from the steam collection manifold 238 into the steam conduit (252, 254, 256, 258).

At least one chamber (e.g., the NaCl dissociation chambers 268) is located between sections of the steam conduit (252, 254, 256, 258). The NaCl dissociation chambers 268 are configured to hold a material (e.g., the sodium-chloride-containing porous material 22) therein and to allow passage of steam 232 therethrough. The NaCl dissociation chambers 268 contain the sodium-chloride-containing porous material 22. As discussed above, sodium chloride is captured in the pores within the polymerized units of the sodium-chloride-containing porous material 22. The porous material 12 releases sodium chloride bonded with the aromatic amino groups and the hydroxyl groups upon exposure to deionized water, i.e., the steam 232 in a vapor form or in a condensated liquid form.

The water is recycled, and substantially pure water reaches the porous material to be cleaned. Thus, the amount of water required for particle regeneration is very small. Estimated amount of needed water is about 10% of the amount of purified water produced by the process.

Furthermore, due to continuous concentration of the extracted NaCl, the process provides NaCl as a solid recovered powder 270. This is an advantage when compared to reverse osmosis (RO processes) which pollutes sea water with highly concentrated rejected NaCl solutions. Unlike reverse osmosis, the extracted NaCl does not reach the sea again, but is simply removed in a solid state, i.e., as NaCl crystals. The impact on the environment is minimal compared with RO.

State of the art vapor compression distillers recycle nearly 98% of the required energy for water distillation. This efficiency, together with the use of a small amount of water for particle recycling provide for substantial energy savings when compared with reverse osmosis.

The energy benefit resulting from using the proposed desalination particles as a replacement of the reverse osmosis is calculated in several scenarios as a function of the specific energy used by different plants. The most advanced and largest state of the art RO plants today use about 2.5 kWh/m$^3$ of purified water. Smaller systems are generally less efficient. Energy consumption can be higher than 5.5 kWh/m$^3$. The following calculation assumes that the proposed desalination process removes 90% of the salt from the sea water. Starting with 35,000 ppm NaCl (sea water) would produce purified water containing 3500 ppm of NaCl. This is above the threshold required for human consumption (500 ppm).

The calculation further assumes that this water is purified by reverse osmosis. However, because the salinity can be decreased by a factor of 10 employing the methods of the present disclosure, the energy required for additional purification by reverse osmosis is minimal. Further, when the particles and their amounts are selected such as to remove above 95% of the initial salt in seawater then no reverse osmosis is necessary.

Table 1 shows energy consumption per unit volume of desalinated water (in kWh/m$^3$ unless noted otherwise) for various processes employed in the desalination method of present disclosure or reverse osmosis.

seawater can be avoided according to the methods of the present disclosure, thereby eliminating the negative environmental impact of reverse osmosis desalination. The methods of the present disclosure can employ particles as the porous material, which are easily portable to remote locations. The porous material of the present disclosure can be employed as desalinating tablets, films or sponges for emergency situations or for military expeditions, with or without recovery.

The NaCl adsorbing characteristics of the aromatic amino groups and hydroxyl groups of the porous surfaces of the present disclosure can be detected by Fourier transform infrared (FTIR) spectroscopy, which can identify the capability to extract and release NaCl for aqueous solutions. The porous material is a solid state material capable of reversible NaCl capture and release.

EXPERIMENTS

In the experimental work, NaCl extraction from sea water was demonstrated in the following manner. A solution of 3.5% NaCl in water (seawater concentration) was poured over a solution of 4,4'-diaminodiphenylmethane (MDA) in methanol. The precipitate was separated and collected. Gravimetric analysis indicated the extraction of 82% of the salt from the solution. The complex NaCl×3MDA was identified by FT-IR spectroscopy, which shows amino coordinated functions when compared with the uncoordinated MDA material. This experiment demonstrated extraction of salt at room temperature and efficient extraction (82%) from seawater.

Recovery of MDA and an amino compound was demonstrated in the following manner. Particles were placed in a soxhlet system and were extracted with hot recirculated water. The Fourier transform infrared (FTIR) spectrum of the recovered powder after water extraction showed almost complete recovery of the uncoordinated (free of NaCl) MDA materials. The potential exists for particle recovery on a commercial scale in an apparatus illustrated in FIG. 4. The principle employed to recycle MDA can be applied to recycling of the porous particles of the present disclosure, which are a solid version of MDA.

TABLE 1

| Process or comparison of processes | High efficiency reverse osmosis plant scenario | Medium efficiency reverse osmosis plant scenario | Low efficiency reverse osmosis plant scenario |
| --- | --- | --- | --- |
| Process A: Desalination of sea water (3.5% NaCl) into potable water employing reverse osmosis only | 2.50 | 4.00 | 5.50 |
| Process B: Desalination of water including 0.35% NaCl into potable water employing reverse osmosis only | 0.22 | 0.22 | 0.22 |
| Energy difference between process A and process B | 2.28 | 3.78 | 5.28 |
| Process C: Desalination of water employing a vapor compression distiller | 15.8 | 15.8 | 15.8 |
| Process D: particle recycling process of the present disclosure | 1.58 | 1.58 | 1.58 |
| Energy savings for a combination of process B and process D (the present disclosure) relative to process A | 0.70 | 2.20 | 3.70 |
| Percentage Energy savings for a combination of process B and process D (the present disclosure) relative to process A | 28% | 55% | 67% |

The present disclosure provides a novel process for desalination of sea water which replaces reverse osmosis. Energy savings from 25% to 70% can be achieved with respect to conventional reverse osmosis process. Release of rejected water including highly concentrated NaCl into the As used herein, the terms "a", "an", and "the" are intended to encompass the plural as well as the singular. In other words, for ease of reference only, the terms "a" or "an" or "the" may be used herein, such as "a chamber", "an electrode", "the solution", etc., but are intended, unless explicitly indicated to the contrary, to mean "at least one," such as "at least one chamber", "at least one electrode", "the at least one solution", etc. This is true even if the term "at least one" is used in one instance, and "a" or "an" or "the" is used in another instance, e.g. in the same paragraph or section. Furthermore, as used herein, the phrase "at least one" means one or more, and thus includes individual components as well as mixtures/combinations.

The term "comprising" (and its grammatical variations) as used herein is used in the inclusive sense of "having" or "including," with which it may be used interchangeably. These terms are not to be construed as being used in the exclusive sense of "consisting only of" unless explicitly so stated.

Other than where expressly indicated, all numbers expressing quantities of ingredients and/or reaction conditions are to be understood as being modified in all instances by the term "about." This includes terms such as "all" or "none" and variants thereof. As used herein, the modifier "about" means within the limits that one of skill in the art would expect with regard to the particular quantity defined; this may be, for example, in various embodiments, ±10% of the indicated number, ±5% of the indicated number, ±2% of the indicated number, ±1% of the indicated number, ±0.5% of the indicated number, or ±0.1% of the indicated number.

Additionally, where ranges are given, it is understood that the endpoints of the range define additional embodiments, and that subranges including those not expressly recited are also intended to include additional embodiments.

As used herein, "formed from," "generated by," and variations thereof, mean obtained from chemical reaction of, wherein "chemical reaction," includes spontaneous chemical reactions and induced chemical reactions. As used herein, the phrases "formed from" and "generated by" are open ended and do not limit the components of the composition to those listed.

The compositions and methods according to the present disclosure can comprise, consist of, or consist essentially of the elements and limitations described herein, as well as any additional or optional ingredients, components, or limitations described herein or otherwise known in the art.

It should be understood that, unless explicitly stated otherwise, the steps of various methods described herein may be performed in any order, and not all steps must be performed, yet the methods are still intended to be within the scope of the disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for recycling a porous desalination material for reuse, the system comprising an apparatus that includes:

A water reservoir provided with a heater and a steam collection manifold configured to guide steam generated from liquid phase water in the water reservoir;

A steam conduit configured to receive steam from the steam collection manifold and to direct the steam through a path extending through the liquid phase water and configured to add condensated steam to the liquid phase water; and At least one chamber located between sections of the steam conduit and configured to hold a material therein and to allow passage of steam therethrough, the at least one chamber containing a porous material comprising polymerized units containing pores therein, each of the polymerized units comprises at least one aromatic amino group and at least one hydroxyl group, where instances of the aromatic amino groups and the hydroxyl groups are arranged within walls of each pore in geometries configured to capture sodium chloride from an aqueous environment.

2. The system of claim 1, further comprising a compressor configured to impel the steam from the steam collection manifold into the steam conduit.

3. The system of claim 1, wherein sodium chloride is captures in the pores within the polymerized units of the porous material.

4. The system of claim 1, wherein the porous material releases sodium chloride bonded with the aromatic amino group sand the hydroxyl groups upon exposure to deionized water.

5. The system of claim 1, wherein capture of sodium chloride by the porous material is effected by coordination to the aromatic amino groups.

6. The system of claim 1, wherein the desalinated water is extracted from particles by mechanically squishing the material.

7. The system of claim 1, wherein the pores have respective maximum dimensions in a range from 0.5 nm to 10 microns.

8. The method of claim 1, wherein a volume percentage of the pores with respect to a total volume of a porous material is in a range from 50% to 97%.

9. The system of claim 1, wherein the at least one aromatic amino group is selected from:
   (a) primary aromatic amines including amino benzene, diamino benzene, 4,4'-diaminodiphenylmethane, 2,2'-diaminophenylmethane, 1 and 2-napthylamine, 1,4-diaminoanthraquinone;
   (b) secondary amines including diphenyl amine, indole, indoline, 1,2,3,4-tetrahydroquinoline, 1,2,3,4-tetrahydroquinoxaline, N,N-substituted 1,4-diaminoanthraquinone, tryptophan, benzimidazole, and phenothiazine; and
   (c) a mixture of primary and secondary aromatic amines.

10. The system of claim 1, wherein the units are selected from units of vinyl-aniline and units of PEG-acrylate, PEG-methacrylate or 2-hydroxyethyl acrylate.

* * * * *